Jan. 17, 1967    K. C. MOSIER    3,298,393
CHECK VALVE HAVING THROTTLING PASSAGE
Filed Nov. 15, 1963

INVENTOR
KENNETH C. MOSIER

BY

ATTORNEY

United States Patent Office 3,298,393
Patented Jan. 17, 1967

3,298,393
CHECK VALVE HAVING THROTTLING PASSAGE
Kenneth C. Mosier, 3516 Springdale Ave.,
Dayton, Ohio 45419
Filed Nov. 15, 1963, Ser. No. 323,945
7 Claims. (Cl. 137—513.3)

My invention relates to fluid valves in general and has particular reference to a valve for use in throttling the flow of fluids.

It is frequently necessary to regulate the speed of operation of a fluid motor, such as a piston driven by compressed air, the function being best accomplished by providing an orifice which restricts the discharge of fluid from the cylinder during operation. At the same time, it is preferable that the fluid under pressure entering the other side of the fluid motor or cylinder be unrestricted, thus avoiding unnecessary loss of power. In some instances regulation of speed of operation in one direction is adequate, but in other instances it is desirable to regulate both the forward and return stroke or motion, this being accomplished by the use of a second similar valve connected to the other port of the fluid motor.

Valves of this type are known in the art and are in many instances reasonably satisfactory in operation. However, they are frequently bulky, relatively expensive, and difficult to adjust. When adjusted, they usually do not visually indicate the adjustment and in many instances permit an unintentional change of adjustment by inability to resist vibration. Furthermore, such valves are not ordinarily self-cleaning, and will malfunction due to ingestion of a foreign object.

It is therefore a primary object of my invention to provide a throttling valve of the type utilizing a variable orifice which is compact, inexpensive, easily adjusted externally, and which permits the free flow of fluid in one direction as well as the throttled or controlled flow of fluid in the opposite direction.

Another important object of my invention is the provision of a valve of the type described which may be accurately adjusted without dismantling the valve to attain all desired regulating positions, including fully opened and fully closed positions and which visually indicates the adjusted position.

A further important object of my invention is the provision of a valve of the type described which is highly resistant to vibration and is largely self-cleaning in operation.

Other important objects of my invention will become apparent from the following detailed description and the appended drawings, in which.

Figure 1:
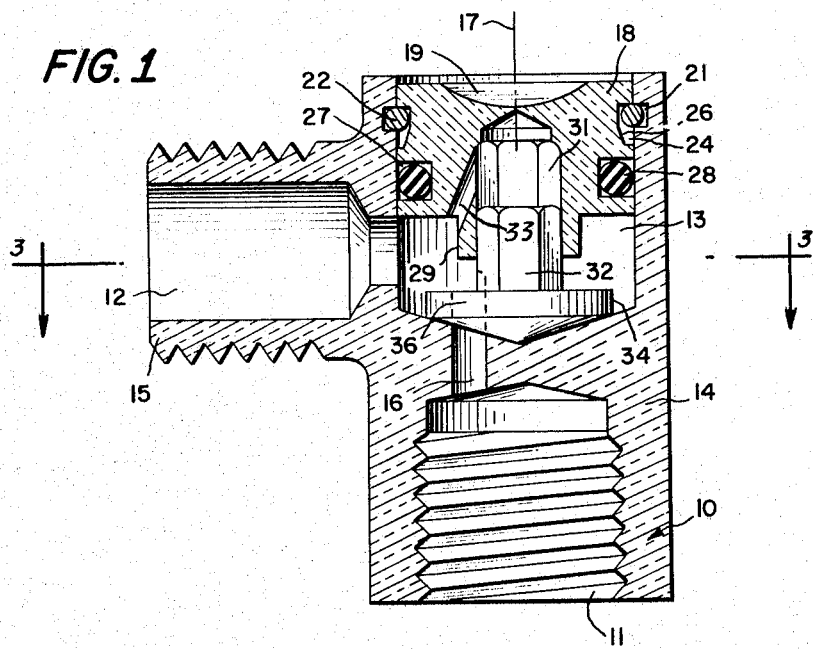
FIGURE 1 is a partial vertical section through a form of my valve.
Figure 2:
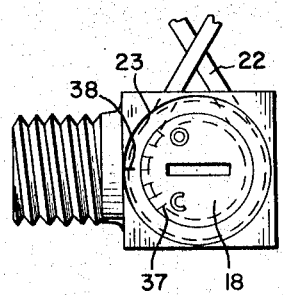
FIGURE 2 is a plan view of my valve.

Referring to the drawings, I have illustrated in FIGURE 1 a typical form of my valve utilizing a body 10 of generally square cross section. A boss 15 projects laterally from the body 10 and is externally threaded. An outlet port 11 is formed in the body 10 as a threaded opening extending along the major axis of the body. An inlet port 12 is formed in the boss 15 and communicates with a chamber 13 formed in the body 10 by boring the body from the end opposite the outlet port 11.

The outlet port 11 and the chamber 13 are separated by a valve seat 14, the upper or seat surface of which is of inverted conical configuration and smoothly finished to provide proper sealing action. A bore 16 extends through the valve seat 14, establishing communication between the outlet port 11 and the chamber 13. Preferably, the cross sectional area of this bore 16 is substantially equal to the smallest cross sectional area of the inlet port 12, which is reduced in diameter as indicated at the point of communication with the chamber 13. The bore 16 is formed parallel to the major axis 17 of the body 10 but is displaced radially therefrom.

The chamber 13 is sealed by a plug 18 of generally cylindrical shape having a screw driver slot 19 formed on its outer end face. In order to lock the plug 18 rotatably in the body 10, I form a groove 21 of generally rectangular cross section in the wall of the chamber 13 near its outer end. The plug 18 is also provided with a registering groove 24 which cooperates with groove 21 to receive a locking wire 22, which is inserted into the opening formed by the grooves 21 and 24 through tangential openings 23 formed in the body 10. The groove 24 is of somewhat greater width than the groove 21 and defines along the lower portion of its innermost surface a tapered section 26. Thus the lower extremity of the groove 24 is of somewhat larger diameter than the upper portion, with the result that should the plug 18 attempt to move outwardly under the influence of fluid pressure in chamber 13, the tapered surface 26 will engage the locking wire 22 and thus lock the plug in position without danger of binding.

Inwardly from the groove 24 is a second groove 27 formed in the plug 18 and dimensioned to receive and support a resilient sealing member such as an O ring 28. An axial boss 29 extends inwardly from the inner face of the plug 18, the latter defining an axial bore 31 of polygonal cross section adapted to receive and slidingly engage a polygonal valve stem 32. Vent means 33 connect the outer extremity of the bore 31 with the chamber 13 thus insuring unrestricted reciprocation of the stem 32 in the bore 31. A disc shaped valve member 34 is formed integrally with the valve stem 32 and is of substantially greater diameter, the inner face of the valve member 34 being shaped as an inverted cone or alternatively as a flat surface for sealing engagement with the mating face of the valve seat 14. A bore 36 extends through the valve member 34 and is spaced radially from the axis 17 for registry with the bore 16. Preferably, the bores 16 and 36 are of circular cross section and of equal diameter.

Figure 3:
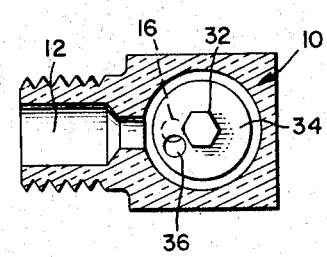
FIGURE 3 is a horizontal section through my valve taken along the plane 3—3 of FIGURE 1.

From the foregoing, it will be apparent that by rotation of the plug 18, the bores 16 and 36 may be placed in complete registry so that communication is established between the outlet port 11, the chamber 13 and the inlet port 12. By rotating the plug 18 this registry may be gradually reduced, as indicated in FIGURE 3, thus forming a variable orifice of constantly diminishing cross section until upon completion of rotation of the plug 18 even partial registry between the bores is eliminated and the valve is closed. To permit accurate and repetitive setting of my valve, the outer face of the plug 18 is provided with calibration marks 37 for alignment with an index mark 38 formed in the body 10 immediately adjacent the marks 37.

The orifice formed by varying the degree of intersection of the through bores 16 and 36 is quite sensitive and satisfactory for a majority of applications. However if closer regulation of relatively low flow rates is desired a groove (not shown in the drawings) of constantly decreasing cross section may be formed on the inner or sealing face of the valve member 34, with the larger end of the groove terminating at the bore 36. The axis of such groove will of course be disposed on a radius about the axis 17.

In operation, the user sets the approximate orifice opening desired by rotation of the plug 18. This determines the effective orifice formed by intersection of the bore 36 and the bore 16 through which pressure fluid must pass. Pressure fluid entering through the inlet port 12 forces the valve member 34 downwardly against the seat 14 thus providing a reliable seal and requiring the pressure fluid to pass through the orifice formed by the intersecting bores 16 and 36. As the direction of fluid flow is reversed, pressure fluid passes from outlet 11 through the bores 16 and 36, lifting the valve member 34 from its seat 14 and forcing its stem 32 upwardly. This permits virtually unrestricted flow of pressure fluid to port 12 and furthermore is effective in dislodging particles of foreign matter which may have found their way into the valve.

Figure 4:
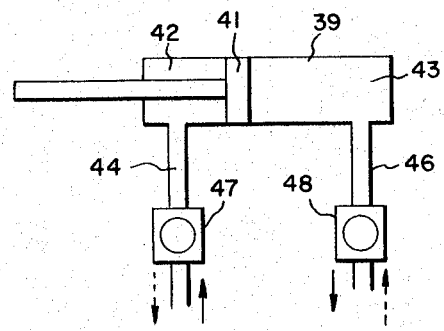
FIGURE 4 is a diagrammatic representation of my valve applied to a typical fluid motor.

My valve is intended primarily for use in conjunction with a fluid motor, such as a cylinder 39 having disposed therein a piston 41 dividing the cylinder into a chamber 42 and a chamber 43. Fluid under pressure may be supplied through conduit 44 to the chamber 42 and through conduit 46 to the chamber 43. Regulation of the speed of movement of the piston 41 is attained by placing a valve of the type herein described, indicated at 47, in the conduit 44 with the inlet port 12 communicating with chamber 42. A similar valve 48 is connected to the conduit 46 with the inlet port 12 also communicating with chamber 43. Pressure fluid may therefore pass through the valve 47 without restriction, driving the piston 41 to the right in FIGURE 4 and forcing fluid from the chamber 43 through the valve 48. In this direction of flow, however, the orifice restricts the flow of fluid which, of course, regulates the speed of movement of the piston 41. When it is desired to move the piston 41 in the opposite direction, the pressure fluid is reversed in direction so that it enters the valve 48 without restrictions and the exhaust from the chamber 42 is throttled through valve 47.

From the foregoing, it will be apparent that I have provided an inexpensive and compact throttling valve for controlling the flow of fluids which may be conveniently adjusted to a predetermined setting simply by rotating the plug 18 to the desired position. The setting will remain constant due to the resistance of the valve to vibration, the latter characteristics being due principally to the locking action of the tapered wall 26 of the groove 24 in the plug 18, engaging the locking wire 22. Furthermore, since the valve member 34 moves away from its seat 14 each time fluid flow occurs from the outlet port 11 to the inlet port 12, it will be seen that the valve is largely self-cleaning.

I claim:

1. A variable orifice fluid flow control valve comprising a body defining first and second ports and a valve seat between said ports, said valve seat having a conical face concentric about a major axis and a first through bore spaced radially from said axis, a valve member having a conical face for sealing engagement with said valve seat and a second through bore movable by rotation of the valve member into registry with said first through bore, said valve member being mounted in said body with freedom to reciprocate axially of said conical face thereof between substantially full open position when the flow through said ports is in one direction and a position in which said conical faces are in contact with each other when the flow is in the opposite direction, plug means rotatably sealed in said body, and means coupling the plug means to the valve member for rotation of said member.

2. The structure defined in claim 1 wherein said plug means defines a polygonal opening having sliding engagement with a polygonal valve stem fixed to the valve member.

3. The structure defined in claim 2 wherein said polygonal stem and polygonal opening are disposed along said major axis.

4. The structure defined in claim 1 wherein said plug means is retained in the body by a wire projecting into registering grooves formed in both said plug means and said body.

5. A variable orifice fluid flow control valve comprising a body defining first and second ports, a valve seat between said ports, and an open chamber between the first port and the valve seat, said body defining a first groove in the wall of the chamber, said valve seat having a conical face concentric about a major axis and a first through bore spaced radially from said axis, a valve member having a conical face for sealing engagement with said valve seat and being disposed in said chamber, said valve member having a second through bore movable by rotation of the valve member into and out of registry with the first through bore in the valve seat thereby defining a variable orifice, a plug rotatably mounted in the body outwardly of said chamber and said first port sealing said chamber and having a second groove on its surface for registry with said first groove, said second groove having a width parallel to the major axis greater than the width of the first groove, the portion of the second groove nearest the valve seat having a diameter greater than the diameter of the portion of the second groove more remote from the valve seat, a wire in said first and second grooves locking the plug rotatably in the body, and means interconnecting the plug and valve member for simultaneous rotation and mounting said valve member for reciprocation axially in said chamber between substantially full open position when the flow through said ports is in one direction and a position in which said conical faces are in contact with each other when the flow is in the opposite direction.

6. The structure defined in claim 5 wherein said variable orifice is defined by intersecting circular through bores.

7. The structure defined in claim 6 wherein said reciprocable means includes a polygonal stem integral with the valve member and having sliding engagement with a mating bore in the plug.

References Cited by the Examiner

UNITED STATES PATENTS

| | | | |
|---|---|---|---|
| 277,661 | 5/1883 | Bangs | 251—208 |
| 1,741,983 | 12/1929 | Ellberg | 251—184 X |
| 2,223,699 | 12/1940 | Norgren | 137—533.71 X |
| 2,226,405 | 12/1940 | Krieck | 137—513.3 |

WILLIAM F. O'DEA, *Primary Examiner.*

H. W. WEAKLEY, *Examiner.*